(12) United States Patent
Kadakia et al.

(10) Patent No.: US 8,343,343 B2
(45) Date of Patent: Jan. 1, 2013

(54) UNDERDRAIN APPARATUS

(75) Inventors: Navin Kadakia, Bridgeville, PA (US);
Edward Kuchtjak, Baden, PA (US);
Keith Baker, Conway, PA (US)

(73) Assignee: Severn Trent Water Purification, Inc., Colmar, PA (US)

( * ) Notice: Subject to any disclaimer, the term of this patent is extended or adjusted under 35 U.S.C. 154(b) by 264 days.

(21) Appl. No.: 12/778,254

(22) Filed: May 12, 2010

(65) Prior Publication Data

US 2010/0314305 A1   Dec. 16, 2010

Related U.S. Application Data

(60) Provisional application No. 61/186,639, filed on Jun. 12, 2009.

(51) Int. Cl.
*B01D 24/24* (2006.01)
(52) U.S. Cl. .................... 210/232; 210/293
(58) Field of Classification Search ........... 210/279, 210/291, 293, 232, 274, 275
See application file for complete search history.

(56) References Cited

U.S. PATENT DOCUMENTS

| | | | |
|---|---|---|---|
| 4,133,766 A | 1/1979 | Adie | |
| 4,340,478 A | 7/1982 | Stannard | |
| 5,019,259 A | 5/1991 | Hambley | |
| 5,376,264 A | 12/1994 | Betancourt | |
| 5,669,737 A | 9/1997 | Equilbec et al. | |
| 5,865,999 A | 2/1999 | Shea et al. | |
| 6,090,284 A | 7/2000 | Melber et al. | |
| 6,110,366 A | 8/2000 | Hunkele et al. | |
| 6,120,723 A | 9/2000 | Butler | |
| 6,143,188 A * | 11/2000 | Jantsch et al. | 210/794 |
| 6,190,568 B1 | 2/2001 | Hunkele | |
| 6,261,453 B1 | 7/2001 | Savage | |
| 6,325,931 B1 | 12/2001 | Roberts et al. | |
| 6,569,327 B2 * | 5/2003 | Roberts et al. | 210/274 |
| 6,740,237 B1 | 5/2004 | Roberts et al. | |
| 6,797,166 B1 | 9/2004 | Hambley et al. | |
| 6,982,034 B2 | 1/2006 | Roberts et al. | |
| 6,989,096 B2 | 1/2006 | Roberts et al. | |
| 6,991,723 B2 | 1/2006 | Roberts et al. | |
| 6,991,726 B2 | 1/2006 | St. Germain | |
| 7,074,329 B2 | 7/2006 | Savage et al. | |
| 7,288,194 B2 | 10/2007 | Roberts et al. | |
| 7,326,351 B2 | 2/2008 | Hambley et al. | |

(Continued)

OTHER PUBLICATIONS

Search Report, WO, Aug. 25, 2010, International Searching Authority. Chinese Patent Office (SIPO) Office Action dated Aug. 23, 2012 for co-pending Chinese patent application No. 201090000942.5.

*Primary Examiner* — Matthew Savage
(74) *Attorney, Agent, or Firm* — D'Ambrosio & Menon, PLLC (57) ABSTRACT

An underdrain apparatus includes one or more underdrain blocks and an anchor assembly that includes one or more support members. Each of the underdrain blocks includes a top wall, a bottom wall, a pair of opposing side walls, a pair of opposing end walls, and a center separation wall that extends between the pair of opposing end walls. The center separation wall of at least one of the underdrain blocks may have one or more apertures formed therein, the apertures configured to receive at least one of the support members. One or more of the side walls of the pair of opposing side walls of the underdrain blocks may have one or more side clips. At least one of the side clips defines an aperture for receiving a support member.

10 Claims, 8 Drawing Sheets

U.S. PATENT DOCUMENTS

| | | |
|---|---|---|
| 7,410,578 B2 | 8/2008 | Hambley et al. |
| 7,497,228 B2 | 3/2009 | Taylor et al. |
| 7,503,726 B2 | 3/2009 | Blackwood |
| 7,618,212 B2 | 11/2009 | Yodock, III et al. |
| 7,654,768 B1 | 2/2010 | Tullis et al. |
| 7,665,250 B2 | 2/2010 | Powell |
| 2007/0235382 A1 | 10/2007 | Roberts et al. |
| 2008/0000825 A1 | 1/2008 | Roberts et al. |
| 2009/0269147 A1 | 10/2009 | Geibel |

* cited by examiner

UNDERDRAIN APPARATUS

CROSS-REFERENCE TO RELATED APPLICATIONS

This application claims the benefit of priority from U.S. Provisional Patent Application No. 61/186,639, filed Jun. 12, 2009, the disclosure of which is hereby incorporated by reference in its entirety.

BACKGROUND

Water, wastewater and industrial liquid filtration units generally include an underdrain system for supporting filter media and for spacing the filter media apart from the filter bottom. In addition to providing support for the filter media, the underdrain system provides other advantages such as collecting the filtered water that passes through the media, and uniformly distributing backwash water, backwash air, or a combination of both, across the filter.

Underdrain systems may include one or more of the following: precast concrete blocks, plastic-jacketed concrete blocks, stainless steel pipe laterals or screens, plastic nozzles or all plastic universal blocks. The underdrain blocks are generally placed side-by-side and end-to-end in the bottom of the filter to provide a "false bottom." During backwash, the blocks tend to lift off the bottom of the filter and shift out of place, interrupting back wash and allowing sand to enter the effluent pipe and mix with filtered water.

The present invention relates to an underdrain apparatus, and more particularly, to an underdrain apparatus that includes one or more underdrain blocks and an anchoring assembly for securing the one or more underdrain blocks to a filter floor.

SUMMARY

In accordance with one or more embodiments of the invention, an underdrain apparatus comprises: one or more underdrain blocks and an anchor assembly that comprises one or more support members. Each of the one or more underdrain blocks comprises: a top wall, a bottom wall, a pair of opposing side walls, a pair of opposing end walls, the pair of opposing side walls and the pair of opposing end walls together connecting the top wall and the bottom wall, and a center separation wall that extends between the pair of opposing end walls. The center separation wall of at least one of the underdrain blocks has one or more apertures formed therein, at least one of the apertures for receiving at least one of the support members. The underdrain apparatus may further include one or more means for securing the one or more support members in or to a floor surface on which the one or more underdrain blocks are disposed.

In accordance with one or more embodiments of the invention, an underdrain apparatus comprises: one or more underdrain blocks and an anchor assembly that comprises one or more support members. Each of the one or more underdrain blocks comprises: a top wall, a bottom wall, a pair of opposing side walls, a pair of opposing end walls, the pair of opposing side walls and the pair of opposing end walls together connecting the top wall and the bottom wall, and a center separation wall that extends between the pair of opposing end walls. At least one side wall of the pair of opposing side walls of at least one of the underdrain blocks has one or more side clips, at least one of the side clips defining an aperture for receiving at least one of the support members. The underdrain apparatus may further include one or more means for securing the one or more support members in or to a floor surface on which the one or more underdrain blocks are disposed.

In accordance with one or more embodiments of the invention, an underdrain apparatus comprises one or more underdrain blocks and an anchor assembly that comprises one or more support members. Each of the one or more underdrain blocks comprises: a top wall, a bottom wall, a pair of opposing side walls, a pair of opposing end walls, the pair of opposing side walls and the pair of opposing end walls together connecting the top wall and the bottom wall, and a center separation wall that extends between the pair of opposing end walls. At least one of: (1) at least one side wall of the pair of opposing side walls, and (2) at least one end wall of the pair of opposing end walls of at least one of the underdrain blocks having one or more apertures formed therein, at least one of the apertures for receiving at least one of the support members.

In accordance with one or more embodiments of the invention, a method for anchoring one or more underdrain blocks to a floor surface on which the one or more underdrain blocks are disposed is disclosed. Each of the one or more underdrain blocks includes a top wall, a bottom wall, a pair of opposing side walls, a pair of opposing end walls, the pair of opposing side walls and the pair of opposing end walls together connecting the top wall and the bottom wall, and a center separation wall that extends between the pair of opposing end walls. The method comprises: providing one or more support members, extending at least one of the support members through at least one of one or more apertures formed in the center separation wall of at least one of the underdrain blocks, and securing the one or more support members in or to the floor surface. The method may further comprise: forming the at least one of the underdrain blocks by an injection molding process, and forming the one or more apertures in the center separation wall of the at least one of the underdrain blocks by a process that is different from the injection molding process. Alternatively, the method may further comprise: forming the at least one of the underdrain blocks by an injection molding process, and integrally forming the one or more apertures in the center separation wall by the injection molding process.

In accordance with one or more embodiments of the invention, a method for anchoring one or more underdrain blocks to a floor surface on which the one or more underdrain blocks are disposed is disclosed. Each of the one or more underdrain blocks includes a top wall, a bottom wall, a pair of opposing side walls, a pair of opposing end walls, the pair of opposing side walls and the pair of opposing end walls together connecting the top wall and the bottom wall, and a center separation wall that extends between the pair of opposing end walls. The method comprises: providing one or more support members, extending the one or more support members through at least one of one or more side clips of at least one side wall of at least one of the underdrain blocks, and securing the one or more support members in or to the floor surface. The method may further comprise: forming the at least one of the underdrain blocks by an injection molding process, and fixedly attaching the one or more side clips to the at least one side wall by a process separate from the injection molding process. Alternatively, the method may further comprise: forming the at least one of the underdrain blocks by an injection molding process, and integrally forming the one or more side clips as part of the at least one of the underdrain blocks by the injection molding process.

These and other embodiments of the invention are described in detail with reference to the following drawings.

DETAILED DESCRIPTION

The present invention relate to an underdrain apparatus. The underdrain apparatus comprises one or more underdrain blocks, and an anchoring assembly that comprises support members. The anchoring assembly may further comprise means for securing one or more of the support members to a floor surface on which the underdrain blocks lay. Further, one or more embodiments of the invention relate to a method for anchoring an underdrain block to a floor surface.

Figure 1A:
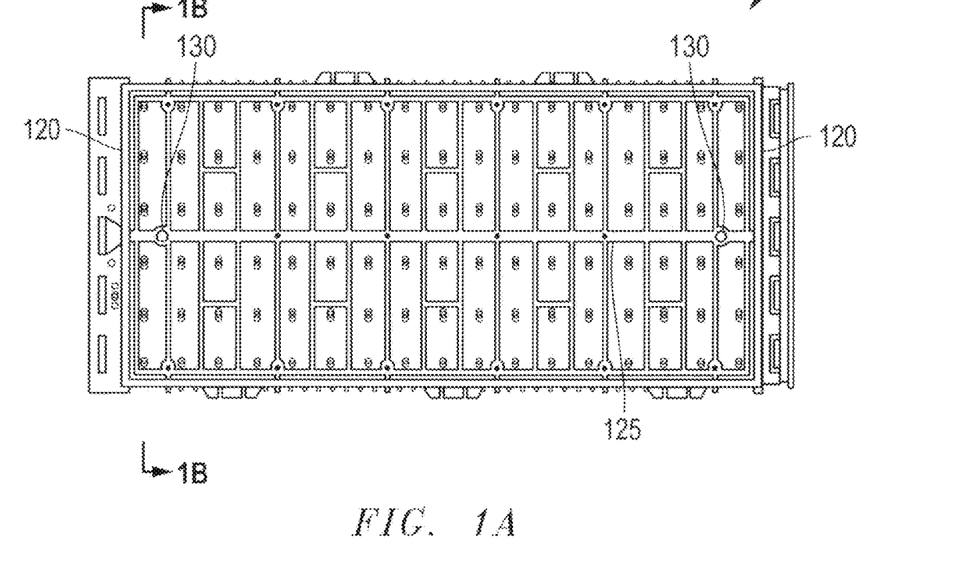
FIGS. 1A-1B show a plan view and a cross-sectional view, respectively, of an underdrain block of an underdrain apparatus in accordance with one or more embodiments of the invention.
Figure 1B:
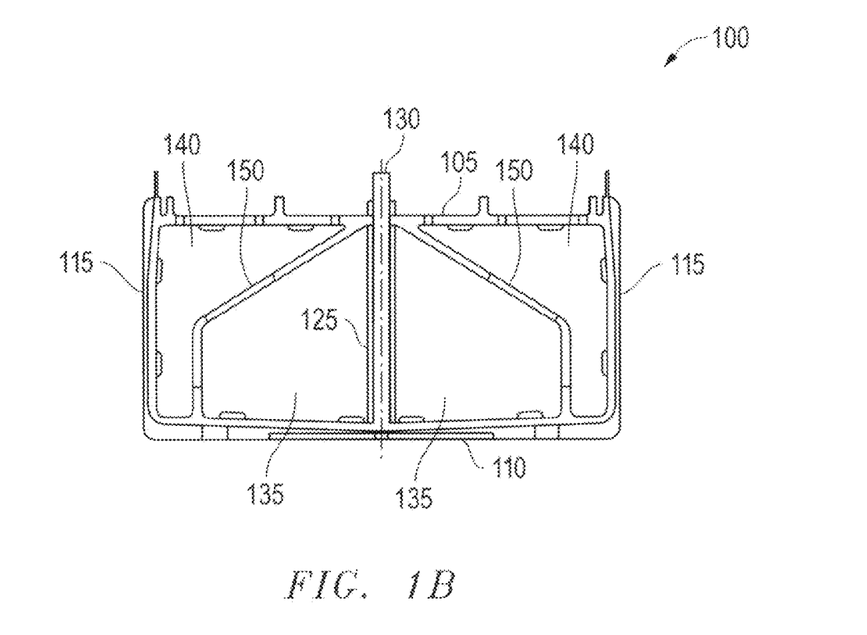

FIGS. 1A and 1B illustrate a plan view and cross-sectional view, respectively, of an underdrain block of an underdrain apparatus in accordance with one or more embodiments of the invention. The underdrain block 100 comprises a top wall 105, a bottom wall 110, a pair of opposing end walls 120 and a pair of opposing side walls 115. The block 100 also includes a center separation wall 125 that extends horizontally between the pair of opposing end walls 120. The center separation wall 125 extends vertically from at or near the top wall 105 to the bottom wall 110. In various embodiments of the invention, the center separation wall 125 may protrude beyond a top surface of the top wall 105. In other embodiments of the invention, the center separation wall 125 may be substantially flush with the top surface of the top wall 105.

The center separation wall 125 may divide the underdrain block 100 into two longitudinal sections. Lateral separation walls 150 may be formed in each longitudinal section thereby forming primary distribution conduits 135 and secondary distribution conduits 140. The lateral separation walls 150 separate the primary distribution conduits 135 from the secondary distribution conduits 140. Further, the center separation wall 125 separates the primary distribution conduits 135 from each other and separates the secondary distribution conduits 140 from each other. The center separation wall 125 may be of any suitable thickness. For example, the thickness of the center separation wall 125 may be in the range of about ⅝ inch to about 1 1/16 inches. A height of the underdrain block 100 in accordance with one or more embodiments of the invention may range from about 6 inches to about 12 inches.

The underdrain block 100 may include apertures 130 formed therein. As used herein, the term "aperture" refers to a hole, gap, crack, slit, or opening of any kind. In the underdrain block illustrated in FIGS. 1A and 1B, the apertures 130 are formed in the center separation wall 125 at opposing ends of the center separation wall 125 along the direction in which the center separation wall 125 extends between the pair of opposing end walls 120. Each aperture 130 may be substantially equidistant from a respective end wall 120. In alternative embodiments of the invention, each aperture 130 may be spaced a different distance from a respective end wall 120. The apertures 130 may be through-holes that extend entirely or substantially entirely through a height of the center separation wall 125. A height of the center separation wall 125 refers to a distance that the center separation wall 125 extends from at or near the top wall 105 to the bottom wall 110.

The apertures 130 may be integrally formed as part of the underdrain block 100 through the same process employed to create the underdrain block 100. For example, if the underdrain block is formed of one or more plastic materials, it may be formed through an injection molding process. The mold that is used to create the underdrain block may be constructed in such a way as to generate an underdrain block through injection molding that includes the apertures 130 integrally formed therein.

Alternatively, the apertures 130 may be formed in the center separation wall 125 of the underdrain block 100 through a process that is separate from the process by which the underdrain block 100 is constructed. For example, the apertures 130 may be drilled or molded into the center separation wall 125 after the underdrain block 100 is formed. More specifically, for example, the underdrain block 100 may be formed through an injection molding process. Initially after formation, the center separation wall 125 of the underdrain block 100 may not include apertures. Thereafter, the apertures 130 may be formed by in the center separation wall 125 by, for example, drilling the apertures into the center separation wall 125.

At least one of the apertures 130 formed in the center separation wall 125 of the underdrain block 100 is capable of receiving a support member. The support member and a means for securing the support member to a floor surface on which one or more underdrain blocks are disposed together form an anchoring assembly in accordance with one or more embodiments of the invention. An underdrain apparatus in accordance with one or more embodiments of the invention comprises an anchoring assembly and one or more underdrain blocks. Various anchoring assemblies in accordance with one or more embodiments of the invention will be described in greater detail through reference to FIGS. 4A-4C.

Figure 2A:
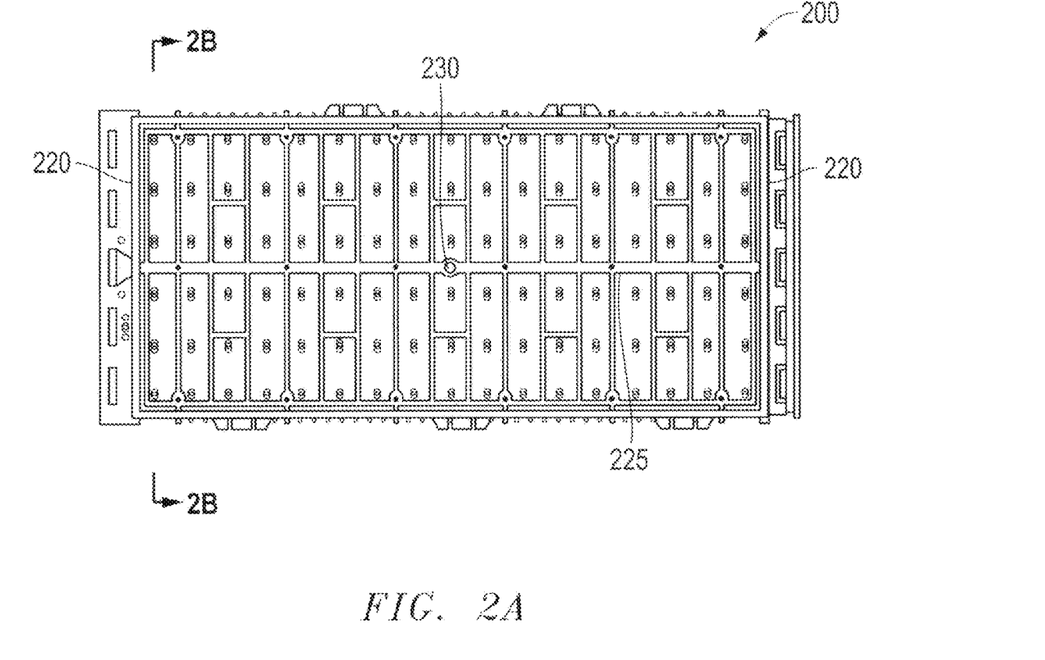
FIGS. 2A-2B show a plan view and a cross-sectional view, respectively, of an underdrain block of an underdrain apparatus in accordance with one or more embodiments of the invention.
Figure 2B:
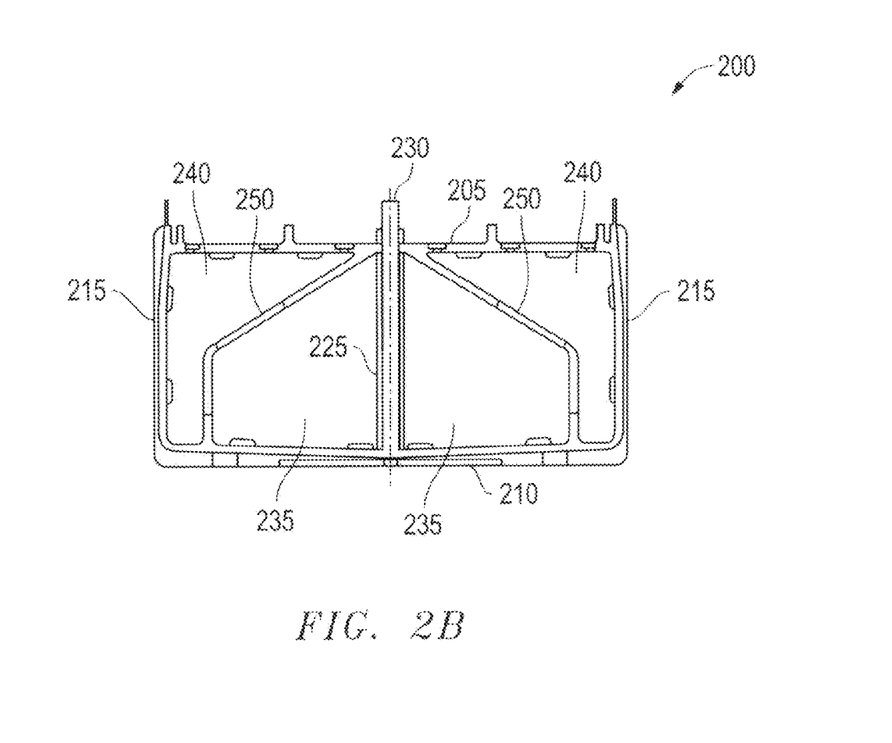

FIGS. 2A and 2B illustrate a plan view and cross-sectional view, respectively, of an underdrain block of an underdrain apparatus in accordance with another embodiment of the invention. Referring to FIGS. 2A and 2B, the underdrain apparatus comprises an underdrain block 200 that includes a top wall 205, a bottom wall 210, a pair of opposing end walls 220 and a pair of opposing side walls 215. The block 200 also comprises a center separation wall 225 that extends horizontally between the pair of opposing end walls 220. The center separation wall 225 extends vertically from at or near the top wall 205 to the bottom wall 210 along a direction that is substantially perpendicular to the direction in which the center separation wall 225 extends between the pair of opposing end walls 220. In various embodiments of the invention, the center separation wall 225 may protrude beyond a top surface of the top wall 205. In other embodiments, the center separation wall 225 may be substantially flush with the top surface of the top wall 205.

Similarly to the underdrain block 100 shown in FIGS. 1A and 1B, the center separation wall 225 may divide the underdrain block 200 into two longitudinal sections. Lateral separation walls 250 may be formed in each longitudinal section to form primary distribution conduits 235 and secondary distribution conduits 240. The lateral separation walls 260 separate the primary distribution conduits 280 from the secondary distribution conduits 290. Further, the center separation wall 225 separates the primary distribution conduits 280 from each other and separates the secondary distribution conduits 290 from each other.

The underdrain block 200 may include an aperture 230 formed in the center separation wall 225. The aperture 230 may be formed in the center separation wall 225 so as to be substantially equidistant from each end wall of the pair of opposing end walls 220. As previously discussed in reference to the underdrain block shown in FIGS. 1A and 1B, the aperture 230 may be integrally formed as part of the underdrain block 100 through the same process employed to create the underdrain block, or may be formed in the center separation wall 225 of the underdrain block 200 through a process that is separate from the process by which the underdrain block 200 is constructed.

Figure 3A:
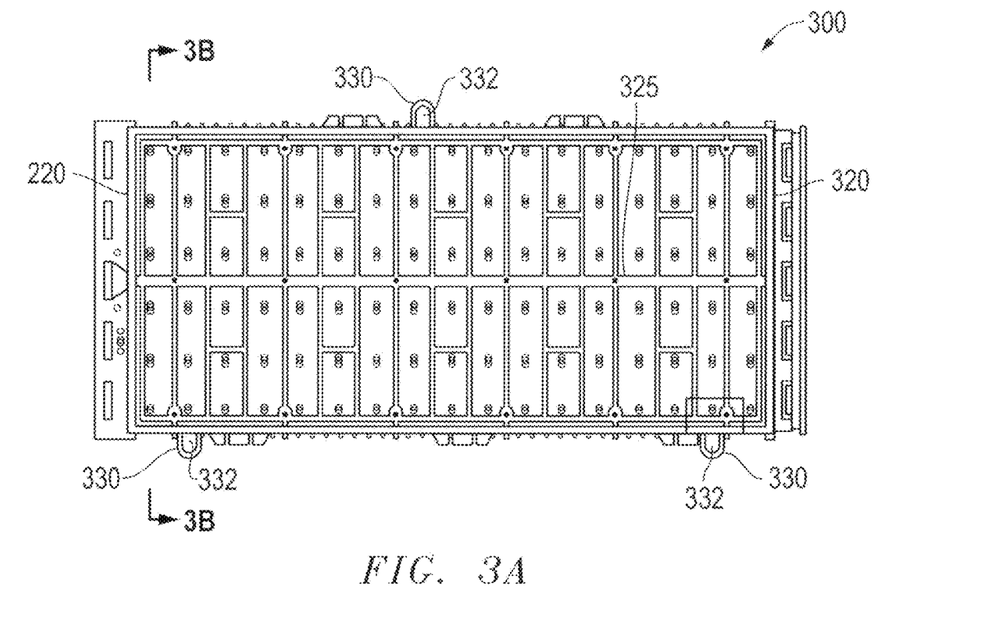
FIGS. 3A-3B show a plan view and a cross-sectional view, respectively, of an underdrain block of an underdrain apparatus in accordance with one or more embodiments of the invention.
Figure 3B:
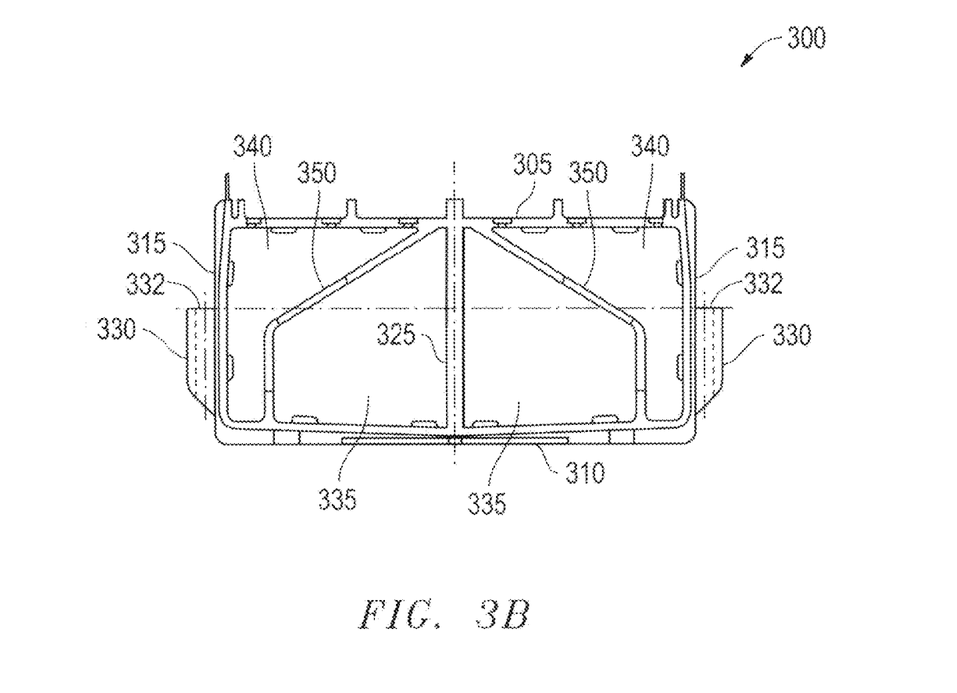

FIGS. 3A and 3B illustrate a plan view and a cross-sectional view, respectively, of an underdrain block of an underdrain apparatus in accordance with one or more embodiments of the invention. The underdrain block 300 is similar in some respects to the underdrain block shown in FIGS. 1A and 1B and the underdrain block shown in FIGS. 2A and 2B in that the underdrain block 300 includes a top wall 305, a bottom wall 310, a pair of opposing end walls 320 and a pair of opposing side walls 315. The block 300 also comprises a center separation wall 325 that extends between the pair of opposing end walls 320. The center separation wall 325 also extends from at or near the top wall 305 to the bottom wall 310 along a direction that is substantially perpendicular to the direction in which the center separation wall 325 extends between the pair of opposing end walls 320. In various embodiments of the invention, the center separation wall 325 may protrude beyond a top surface of the top wall 305. In other embodiments, the center separation wall 325 may be substantially flush with the top surface of the top wall 305.

Similarly to the underdrain block 100 shown in FIGS. 1A and 1B and the underdrain block 200 shown in FIGS. 2A and 2B, the center separation wall 325 may divide the underdrain block 300 into two longitudinal sections. Lateral separation walls 350 may be formed in each longitudinal section to form primary distribution conduits 335 and secondary distribution conduits 340. The lateral separation walls 360 separate the primary distribution conduits 380 from the secondary distribution conduits 390. Further, the center separation wall 325 separates the primary distribution conduits 380 from each other and separates the secondary distribution conduits 390 from each other.

Each of the pair of opposing side walls 315 may comprise one or more side clips 330. Each of the side clips 330 defines an aperture 332 for receiving a support member. The side clips 330 may be integrally formed with the underdrain block 300 as part of the same process by which the underdrain block 300 is formed. For example, the underdrain block 300 may be formed by an injection molding process, and as part of the injection molding process, the side clips 330 may be integrally formed with the opposing side walls 315 of the underdrain block 300. In one or more alternative embodiments of the invention, the side clips 330 may be formed separately from the underdrain block 300, and subsequently fixedly attached to the pair of opposing side walls 315. The side clips 330 may be secured to the pair of opposing side walls 315 by an adhesive, a mechanical retention mechanism such as a combination of bolts, nuts, and washers, or any other suitable retention mechanism known in the art.

As shown in FIG. 3A, the underdrain block 300 includes one side clip 330 positioned in a substantially central position of one of the side walls of the pair of opposing side walls 315 along a direction in which the side wall extends from one end wall 320 to the other end wall 320. The underdrain block 300 further includes two side clips 330 positioned at opposing ends of the opposing side wall of the pair of opposing side walls 315. Such a staggered array of side clips 330 avoids interference of the side clips of the underdrain block 300 with the side clips of an adjacent underdrain block (not shown) when the underdrain blocks are placed side-by-side.

As noted above, an underdrain apparatus in accordance with one or more embodiments of the invention comprises one or more underdrain blocks (such as those described in reference to FIGS. 1A-3B) and an anchor assembly. In this aspect, the anchor assembly may include one or more support members and one or more means for securing the one or more support members to a floor surface on which the one or more underdrain blocks are disposed.

The one or more support members may comprise an anchor rod, an anchor U-rod, a partially-threaded bolt, a fully-threaded bolt, or any other suitable support member known in the art. Each aperture formed in the center separation wall of an underdrain block in accordance with one or more embodiments of the invention may receive a separate support member. Likewise each side clip formed on a side wall of an underdrain block in accordance with one or more embodiments of the invention may receive a separate support member.

Figure 4A:
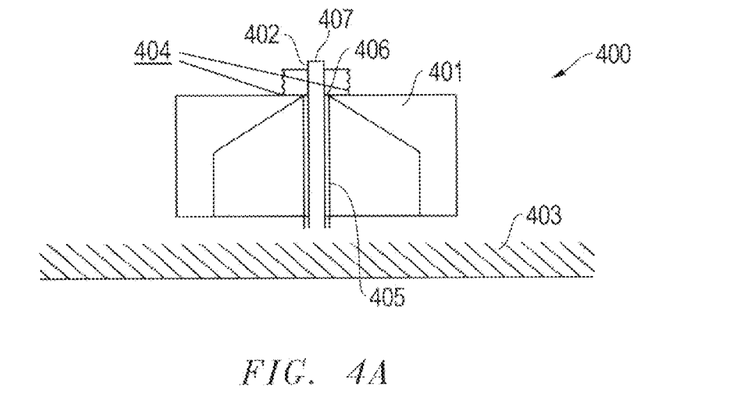
FIGS. 4A-4D show various views of underdrain apparatuses in accordance with one or more embodiments of the invention.

Referring to FIG. 4A, an underdrain apparatus 400 in accordance with one or more embodiments of the invention is shown in cross-sectional view. The underdrain apparatus 400 comprises an underdrain block 401, a support member 402, and a means 403 for securing the support member 402 to a floor surface upon which the underdrain block 401 is disposed. The floor surface may be, for example, a filter floor of an underdrain filtration system. The underdrain block 401 has an aperture 406 formed in a center separation wall 405 thereof in accordance with one or more previously discussed embodiments.

The support member 402 may be an anchor rod, a partially-threaded bolt, a fully-threaded bolt, or any other suitable support member known in the art. The means 403 for securing the support member 402 to a floor surface upon which the underdrain block 401 is disposed may be, for example, a sealing material such as grout which has been disposed on the floor surface or a chemical adhesive such as an epoxy resin.

Although a single underdrain block 401 is shown in FIG. 4A, it should be noted that in this embodiment as well as one or more other embodiments of the invention, a plurality of underdrain blocks may be placed on the floor surface. For example, one or more underdrain blocks may be disposed on the grouted floor surface. Underdrain blocks in accordance with one or more embodiments of the invention may be laterally spaced from one another by about 12 to about 24 inches. In an embodiment of the invention, the lateral spacing may be about 18 inches, requiring an underdrain block having a width that is within a range of about 16½ inches to about 17 inches in order to allow for a gap between adjacent underdrain blocks in which grout may be disposed. Grout may be used both on the floor surface prior to placement of the underdrain blocks as well as in gaps present between lateral strings of blocks to hold the blocks in place and to seal any openings or spaces.

If the means 403 for securing the support member 402 to the floor surface is grout, the support member 402 may at least partially penetrate the layer of grout so as to secure the underdrain block 401 to the floor surface. If the means 403 is a chemical adhesive, for example, the chemical adhesive may serve to adhere the support member 402 to the floor surface, and thereby secure the underdrain block 401 to the floor surface. It should be noted that according to one or more embodiments of the invention, a combination of grout, a chemical adhesive, and any other suitable retention mechanism (e.g. an anchor bolt) may be used to secure the support member 402 to the floor surface.

As shown in FIG. 4A, a proximal end 407 of the support member 402 may be secured to the underdrain block 401 using any suitable retention mechanism 404 known in the art. For example, the retention mechanism 404 may be any combination of nuts, bolts, washers, and screws. In this manner, the retention force supplied by the means 403 may be reinforced. Additional retention mechanisms are advantageous during backwash operations that exert a significant uplift force on the underdrain blocks.

Figure 4B:
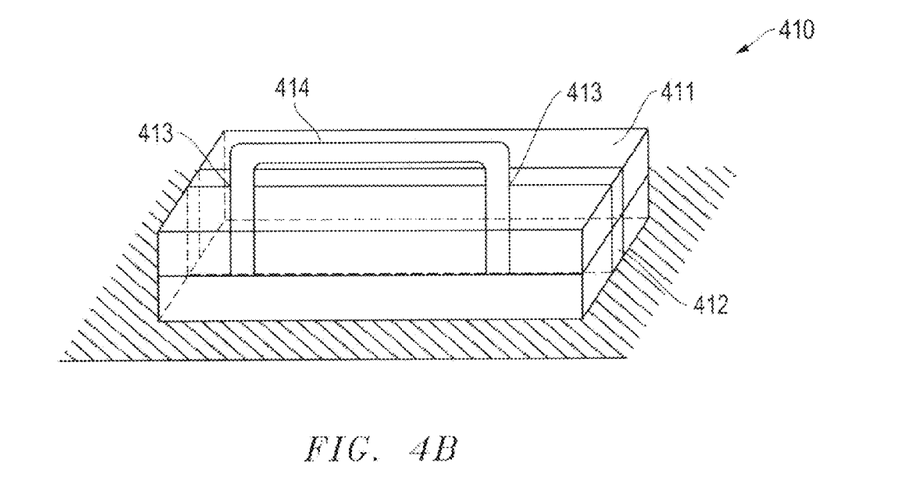

An underdrain apparatus in accordance with one or more embodiments of the invention is shown in FIG. 4B in perspective view. The underdrain apparatus 410 comprises an underdrain block 411 that includes a center separation wall 412 having two apertures 413 formed therein at opposing ends of the center separation wall 412. A support member 414 may be an anchor U-rod. Each end of the anchor U-rod 414 may be received by one of the apertures 413. The anchor U-rod 414 may be secured to a floor surface by any of the means previously described. That is, the anchor U-rod 414 may be secured to the floor surface by a sealing material such as grout, a chemical adhesive, a mechanical retention mechanism such as one or more anchor bolts, or any other suitable retention mechanism known in the art.

Figure 4C:
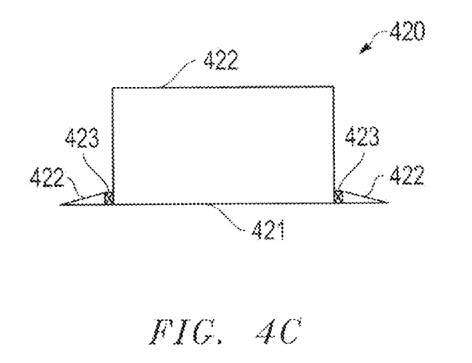

FIG. 4C depicts, in cross-sectional view, an underdrain block that may be used in connection with an underdrain apparatus in accordance with one or more embodiments of the invention. The underdrain block 420 may include one or more ribs 423 that extend from the bottom wall 421 and away from the top wall 422. The underdrain block 420 may further include one or more flanges 422, each of the one or more flanges 422 extending outwardly from a corresponding rib 423 on the bottom wall 421. A sealing material (such as grout) that is disposed on the floor surface may be disposed so as to cover and/or adhere to at least a portion of at least one flange 422. In this manner, the retention force provided by any means used to secure a support member in or to the floor surface in accordance with one or more previously disclosed embodiments may be reinforced by the retaining force provided by placing the sealing material over at least a portion of at least one flange 422.

Figure 4D:
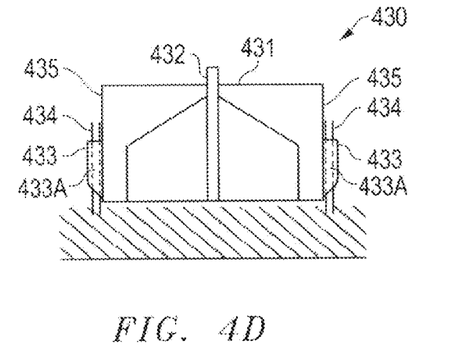

FIG. 4D depicts a cross-sectional view of an underdrain apparatus 430 in accordance with one or more embodiments of the invention. The underdrain apparatus 430 comprises an underdrain block 431 that includes a center separation wall 432. The underdrain block 431 includes side clips 433 formed on each side wall 435 of a pair of opposing side walls. Support members 434 are received by apertures 433A defined by the side clips 433. The support members 434 may be any of the support members previously described. Further, each support member 434 may be the same type of support member or a different type of support member.

In one aspect of this invention, the underdrain apparatus 430 comprises at least one pair of side clips 433, each side clip 433 comprising an aperture 433A, so that the side clips 433 within each pair of side clips are positioned within the same vertical plane. In this configuration, a support member 434 is able to pass through each aperture 433A of the pair of side clips 433.

The support members 434 may be secured to a floor surface on which the underdrain block 431 is disposed by any of the means previously described. For example, the support members 434 may be secured to the floor surface using a sealing material such as grout, a chemical adhesive, a mechanical retention mechanism (e.g. anchor bolt), or any other suitable retention mechanism known in the art. Although the center separation wall 432 does not include apertures in the embodiment shown in FIG. 4D, it should be noted that according to one or more embodiments of the invention an underdrain block may include a center separation wall having one or more additional apertures formed therein in addition to the apertures 433A formed in the one or more side clips 433 formed on at least one side wall of the underdrain block. Support members 434 may be received by both the one or more additional apertures as well as apertures defined by the one or more side clips 433A.

The various anchoring assemblies in accordance with one or more embodiments of the invention are advantageous in that they are positive anchor assemblies that allow for an individual underdrain block to be secured by a single anchor assembly. This eliminates the dependency present in conventional systems that employ a single anchor mechanism to cooperatively anchor multiple underdrain blocks. Also, embodiments of the invention do not require the use of expensive steel plates or bars to hold down the underdrain blocks, which may result in cost-savings in comparison to conventional systems and methods.

Figure 5A:
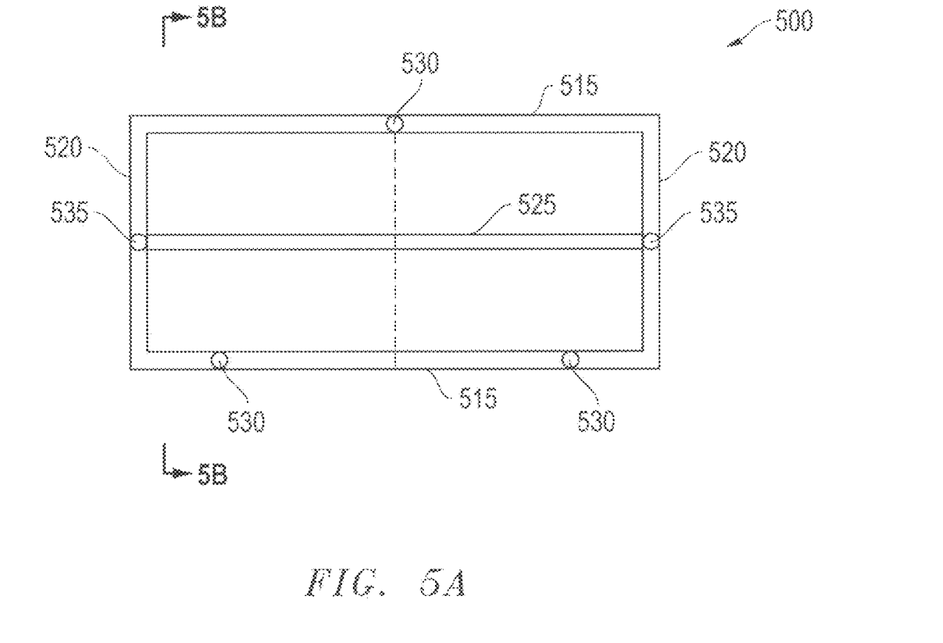
FIGS. 5A-5B show a plan view and a cross-sectional view, respectively, of an underdrain apparatus in accordance with one or more embodiments of the invention.
Figure 5B:
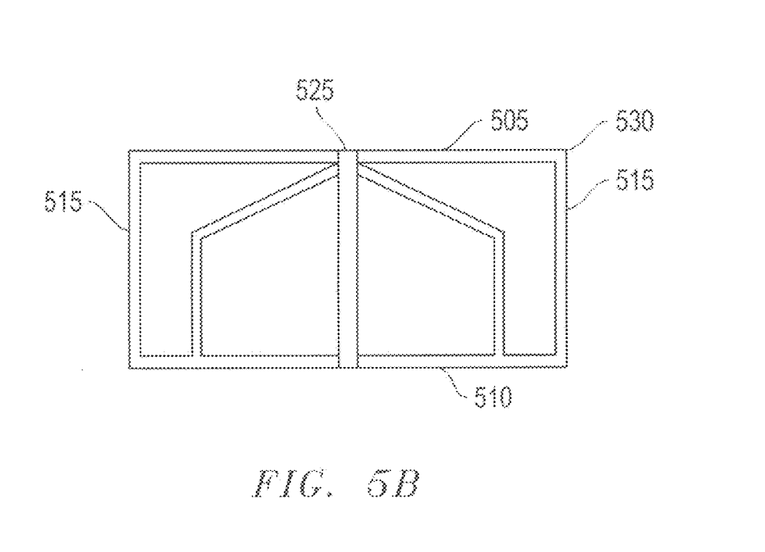

FIGS. 5A and 5B illustrate a plan view and a cross-sectional view, respectively, of an underdrain block of an underdrain apparatus in accordance with one or more embodiments of the invention. The underdrain block 500 comprises a top wall 505, a bottom wall 510, a pair of opposing end walls 520 and a pair of opposing side walls 515. The block 500 may also optionally include a center separation wall 525 that extends between the pair of opposing end walls 520. The center separation wall 525 may also extend from at or near the top wall 505 to the bottom wall 510 along a direction that is substantially perpendicular to the direction in which the center separation wall 525 extends between the pair of opposing end walls 520.

The underdrain block 500 may include apertures 530 formed in the pair of opposing side walls 515. Further, the underdrain block 500 may include apertures 535 formed in the pair of opposing end walls 520. The apertures 530, 535 may be through-holes that extend entirely or substantially entirely through a height of the opposing side walls 515 and the opposing end walls 520.

Although FIG. 5a depicts the underdrain block 500 as having a particular number of apertures 530 formed in each side wall of the pair of opposing side walls 515 and a particular number of apertures 535 formed in each end wall of the pair of opposing end walls 520, numerous other embodiments are clearly within the scope of the invention. For example, embodiments that include any number of apertures formed in any of the side walls or end walls of the underdrain block 500 are within the scope of the invention. Further, in accordance with one or more embodiments of the invention, one or more apertures 530 may be formed anywhere along either side wall of the pair of opposing side walls 515. Similarly, one or more apertures 535 may be formed anywhere along either end wall of the pair of opposing end walls 520. In accordance with one or more embodiments of the invention, one or more apertures may be formed anywhere along the center separation wall 525 in addition to any apertures that are formed in either of the pair of opposing side walls 515 and/or either of the pair of opposing end walls 520.

Any of the apertures formed in either of the pair of opposing side walls 515 and/or either of the pair of opposing end walls 520 and/or the center separation wall 525 may be integrally formed as part of the underdrain block 100 through an injection molding process. Alternatively, the apertures may be formed through a process that comprises at least one step that is separate from each step of the process by which the underdrain block 500 is constructed. For example, the apertures may be drilled or molded into the underdrain block 500 after the block is formed through, for example, an injection molding process.

At least one of the apertures formed in the underdrain block 500 is capable of receiving a support member. In one or more exemplary embodiments of the invention, each aperture that is formed anywhere in the underdrain block 500 is capable of receiving a support member. An underdrain apparatus in accordance with one or more embodiments of the invention includes an anchoring assembly and one or more underdrain blocks. The anchoring assembly comprises one or more support members, and may further comprise one or more means for securing the one or more support members to a floor surface on which the one or more underdrain blocks are disposed. In an underdrain apparatus in accordance with one or more embodiments of the invention, the underdrain block 500 may be used in connection with any combination of underdrain blocks and anchor assemblies of one or more embodiments of the invention.

Figure 6A:
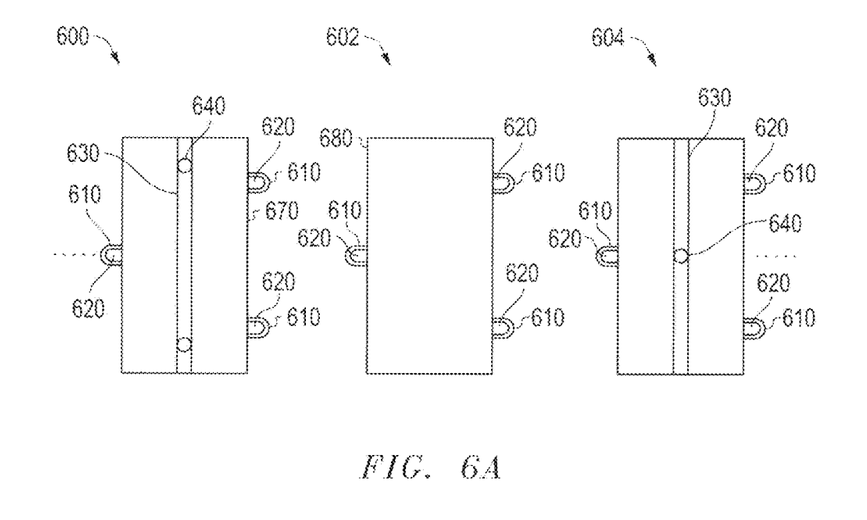
FIGS. 6A-6B each show underdrain apparatuses in accordance with one or more embodiments of the invention.
Figure 6B:
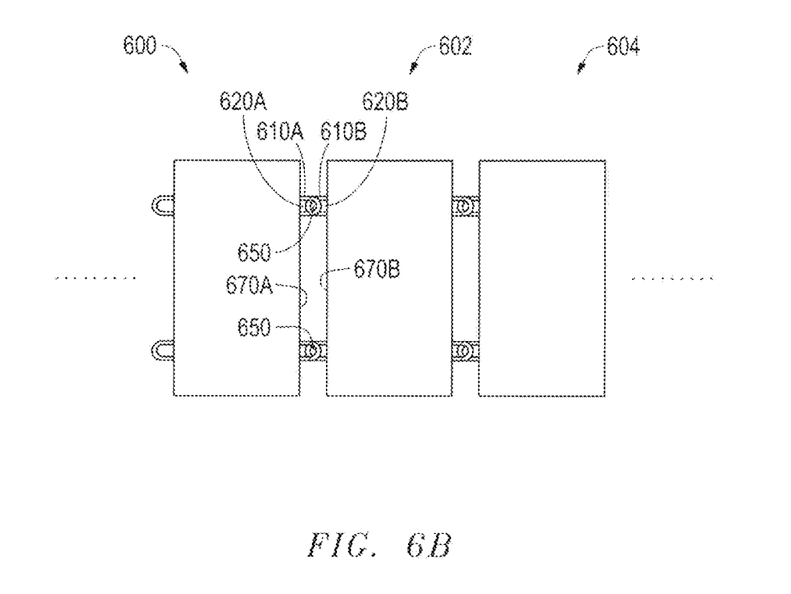

FIGS. 6A and 6B depict plan views of arrangements of underdrain blocks in underdrain apparatuses in accordance with one or more embodiments of the invention. FIG. 6A shows underdrain blocks 600, 602, 604 positioned side-by-side in a row. Although FIG. 6A depicts three underdrain blocks, any number of blocks may be positioned in a row of underdrain blocks, and any number of rows of blocks may be placed on a floor surface such that end walls of blocks in one row of blocks oppose end walls of blocks in another row of blocks.

Each underdrain block 600, 602, or 604 includes side clips 610 that may be integrally formed with side walls of the block or that may be separately fixedly attached to the side walls of the block. Each side clip 610 defines an aperture 620 for receiving a support member (not shown). The side clips 610 are formed in such a way so as to allow for a staggered arrangement of side clips between adjacent underdrain blocks. In particular, two side clips 610 are shown on a side wall 670 of underdrain block 600 at substantially opposing ends of the side wall 670 in a direction in which the side wall 670 extends between end walls of the block 600. Underdrain block 602, which is positioned adjacent to underdrain block 600, has one side clip 610 formed in on a side wall 680 in a substantially central position in a direction in which the side wall 680 extends between end walls of the block 602. Forming the side clips in this arrangement prevents interference between the side clips 610 on side wall 670 of underdrain block 600 with side clip 610 on side wall 680 of underdrain block 602.

Although a specific arrangement of side clips 610 is shown in FIG. 6A, it should be noted that other side clip arrangements and configurations are within the scope of the invention. For example, the staggered arrangement of side clips of adjacent underdrain blocks shown in FIG. 6A may be repeated by including additional side clips on each opposing side wall 670, 680. Further, each underdrain block 600, 602, 604 may optionally include a center separation wall having apertures formed therein in accordance with one or more previously discussed embodiments. For instance, in FIG. 6A, underdrain block 600 is shown having a center separation wall 630 with apertures 640 formed therein at opposing longitudinal ends of the center separation wall 630. Underdrain block 604 is shown having a center separation wall 630 with an aperture 640 formed therein at a substantially central position in the longitudinal direction of the center separation wall 630.

FIG. 6B depicts a plan view of an arrangement of underdrain blocks of an underdrain apparatus in accordance with one or more embodiments of the invention. In this embodiment, a first underdrain block 600 includes a side wall 670A having side clips 610A formed or attached thereon. A second underdrain block 602 is positioned adjacent to the first underdrain block. A side wall 680 of block 602 has side clips 610B formed or attached thereon. As shown in FIG. 6B, side wall 670A opposes side wall 670B. The side clips 610A and 610B are formed at different positions along side walls 670A and 670B, respectively, in a direction extending from top walls of the underdrain blocks 600, 602 to bottom walls thereof. However, the side clips 610A and 610B are formed at substantially the same positions on side walls 670A and 670B, respectively, in a lengthwise direction of the side walls (i.e. a direction in which the side walls extend that is parallel to a surface on which the underdrain blocks are disposed).

Side clips 610A and 610B define apertures 620A and 620B, respectively. As a result of the positions at which the side clips 610A and 610B are formed on side walls 670A and 670B, respectively, the apertures 620A and 620 define at least a partial overlap 650 such that the overlap 650 is capable of receiving a same support member. Although each underdrain block 600, 602, 604 is shown in FIG. 6B as having two side clips formed on each side wall, other arrangements and configurations are within the scope of the invention. For example, the number of side clips on opposing side walls of an underdrain block may differ. Further, the positioning of the side clips may be altered from the arrangement of the embodiment shown in FIG. 6B as long as, with respect to this embodiment of the invention, apertures defined by side clips on opposing side walls of adjacent underdrain blocks form at least a partial overlap such that the apertures of capable of receiving a same support member through the overlap.

Figure 6C:
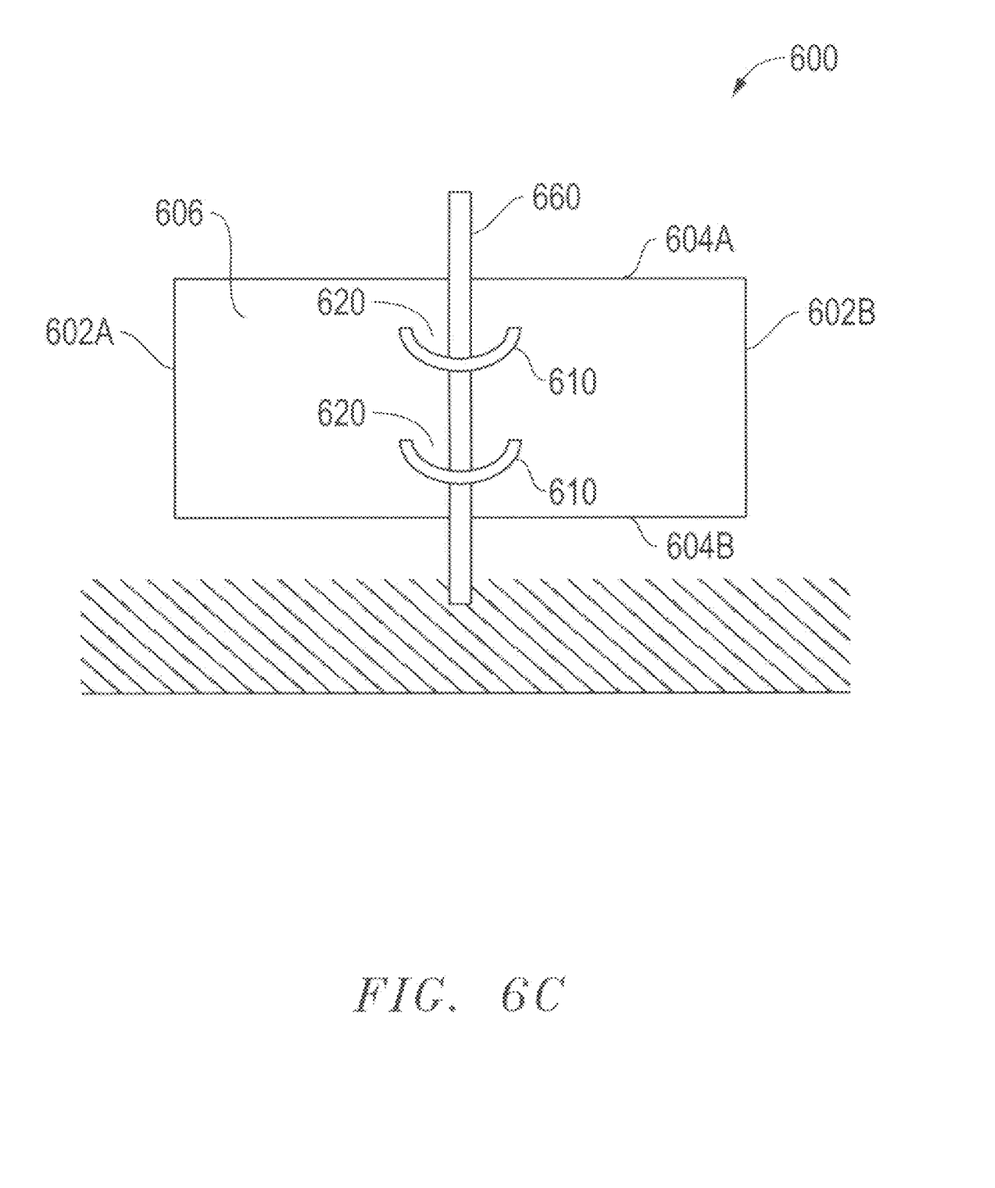
FIG. 6C shows an underdrain block in accordance with one or more embodiments of the invention.

FIG. 6C shows a side view of an underdrain block in accordance with one or more embodiments of the invention. The underdrain block 600 includes a top wall 604A, a bottom wall 604B, and end walls 602A and 602B. Side clips 610 are formed at different positions on a side wall 606 of the block 600 in a direction in which the side wall 606 extends between top wall 604A and bottom wall 604B. However, the side clips 610 are formed at substantially the same position in a direction in which the side wall 606 extends from end wall 602A to end wall 602B. Each side clip 610 defines an aperture 620 for receiving a support member. Due to the positioning of the side clips 610 on side wall 606, each aperture 620 is capable of receiving a same support member 660. Although only one support member 660 is shown in FIG. 6C, the apertures 620 may receive additional support members. In this configuration, the retention force provided by the support member 660 is reinforced by the presence of multiple side clips 610.

Figure 7:
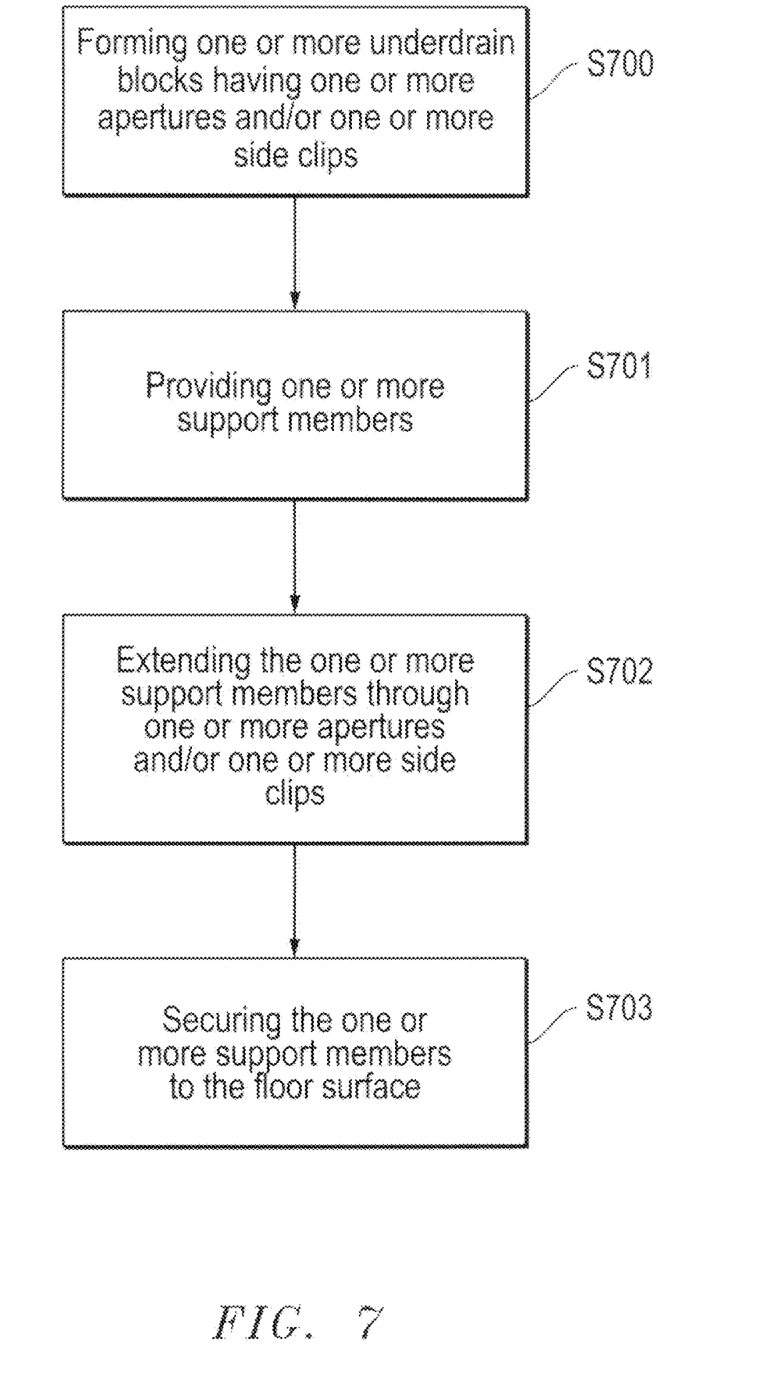
FIG. 7 shows a flowchart depicting a method in accordance with one or more embodiments of the invention

FIG. 7 depicts a flowchart of a method in accordance with one or more embodiments of the invention. In step S700 of the method, one or more underdrain blocks in accordance with one or more embodiments of the invention are formed. Each of the one or more underdrain blocks may be an underdrain block in accordance with any of the previously disclosed embodiments. Each of the one or more underdrain blocks includes a top wall, a bottom wall, a pair of opposing side walls, a pair of opposing end walls, the pair of opposing side walls and the pair of opposing end walls together connecting the top wall and the bottom wall. An underdrain block that is formed in step S700 may further include a center separation wall that extends between the pair of opposing end walls. The center separation wall may have apertures formed therein in accordance with any of the previously disclosed embodiments. Further, one or more of the underdrain blocks may include side clips formed on at least one side wall of the underdrain blocks. Further, one or more of the underdrain blocks may include apertures formed in either side wall of the pair of opposing side walls and/or either end wall of the pair of opposing end walls. It should be noted that a single underdrain block that is formed may include a center separation wall having one or more apertures formed therein, and/or one or more side clips formed on at least one side wall thereof, and/or one or more apertures formed in either side wall of the pair of opposing side walls and/or either end wall of the pair of opposing end walls As discussed earlier, the one or more underdrain blocks may be formed through an injection molding process. Apertures formed in the center separation wall and/or side walls and/or end walls of an underdrain block formed in step S700 may be integrally formed as part of the underdrain block through the same injection molding process. Similarly, side clips formed on at least one side wall of an underdrain block may be integrally formed as part of the underdrain block through the same injection molding process. Alternatively, one or more apertures may be formed through a process that is separate from the injection molding process. Stated another way, the one or more apertures may be formed through a process that includes at least one step that is different from each step of the process by which the underdrain block is formed. Similarly, one or more side clips may be separately formed from the underdrain block and then fixedly attached or secured to the underdrain block.

After the one or more underdrain blocks are formed in step S700, one or more support members are provided in step S701. The one or more support members may be any of the support members previously described. Then, in step S702, the one or more support members are extended through one or more apertures and/or one or more side clips. It should be noted that the one or more underdrain blocks that are formed in step S700 may include underdrain blocks in accordance with any of the previously disclosed embodiments as well as any combination of the previously disclosed embodiments. For example, an underdrain block may include a center separation wall having multiple apertures formed therein and no side clips disposed on the side walls of the block. Alternatively, an underdrain block may include a center separation wall having a single aperture formed therein and no side clips disposed on the side walls of the block. In other embodiments, the underdrain block may include a center separation wall having one or more apertures formed therein and one or more side clips formed on at least one side wall of the block. In still other embodiments, an underdrain block may include one or more side clips disposed on at least one side wall of the block and may either include a center separation wall that does not have any apertures formed therein, or may not include a center separation wall at all. In still other embodiments, an underdrain block may include one or more apertures formed in either side wall of the pair of opposing side walls and/or apertures formed in either end wall of the pair of opposing end walls, and may optionally include a center separation wall that either has or does not have one or more apertures formed therein, and may further optionally have side clips on at least one side wall of the block. The foregoing are merely exemplary, and it should be understood that several other embodiments and combinations of embodiments are within the scope of the invention.

After the one or more support members have been extended through one or more apertures and one or more side clips, in step S703, the one or more support members are secured to a floor surface on which the one or more underdrain blocks are disposed. The one or more support members may be secured to the floor surface using any of the previously disclosed means for securing the support members.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. An underdrain apparatus for placement on a floor surface of a filter comprising:
    an anchor assembly, the anchor assembly comprising one or more support members; and
    one or more underdrain blocks configured to be disposed on the floor surface, each of the one or more underdrain blocks comprising:
    a top wall;
    a bottom wall defining a bottom surface configured to be placed on the floor surface;
    a pair of opposing side walls;
    a pair of opposing end walls, the pair of opposing side walls and the pair of opposing end walls together connecting the top wall and the bottom wall;
    a center separation wall that extends substantially vertically between the top wall and the bottom wall and between the pair of opposing end walls, the center separation wall dividing the underdrain block into two longitudinal halves, the center separation wall further protruding upwardly beyond a top surface of the top wall to define a top end of the center separation wall; and
    one or more apertures that extend substantially vertically through the underdrain block from the top end of the center separation wall to the bottom surface of the bottom wall, at least one of the apertures structurally configured to receive at least one of the support members, the one or more support members being configured to be secured to the floor surface on which each of the underdrain blocks are disposed.

2. The underdrain apparatus of claim 1, comprising one or more means for securing the support members to the floor surface, the one or more means for securing the support members comprises an adhesive.

3. The underdrain apparatus of claim 1, wherein the center separation wall of the at least one of the underdrain blocks comprises an aperture formed therein at a position substantially equidistant from each end wall of the pair of opposing end walls.

4. The underdrain apparatus of claim 1, wherein the center separation wall of the at least one of the underdrain blocks comprises two apertures formed therein at opposing ends of the center separation wall.

5. The underdrain apparatus of claim 3, wherein the one or more support members comprises a U-rod that extends through each of the two apertures formed at the opposing ends of the center separation wall.

6. The underdrain apparatus of claim 1, the center separation wall of the at least one of the underdrain blocks having at least one aperture that extends substantially through an entire height of the center separation wall, the height of the center separation wall extending in a direction substantially perpendicular to a direction in which the center separation wall extends between the pair of opposing end walls.

7. The underdrain apparatus of claim 1, the center separation wall of the at least one of the underdrain blocks having at least one aperture that is integrally formed as part of the center separation wall.

8. The underdrain apparatus of claim 1, wherein the one or more support members comprises an anchoring rod.

9. The underdrain apparatus of claim 8, wherein the anchoring rod comprises a proximal end and a distal end, the distal end penetrating a floor surface of an underdrain filter.

10. The underdrain apparatus of claim 9, wherein the proximal end of the anchoring rod is secured to the at least one underdrain block using at least one of a washer, a nut, and a locknut.

* * * * *